Patented May 8, 1923.

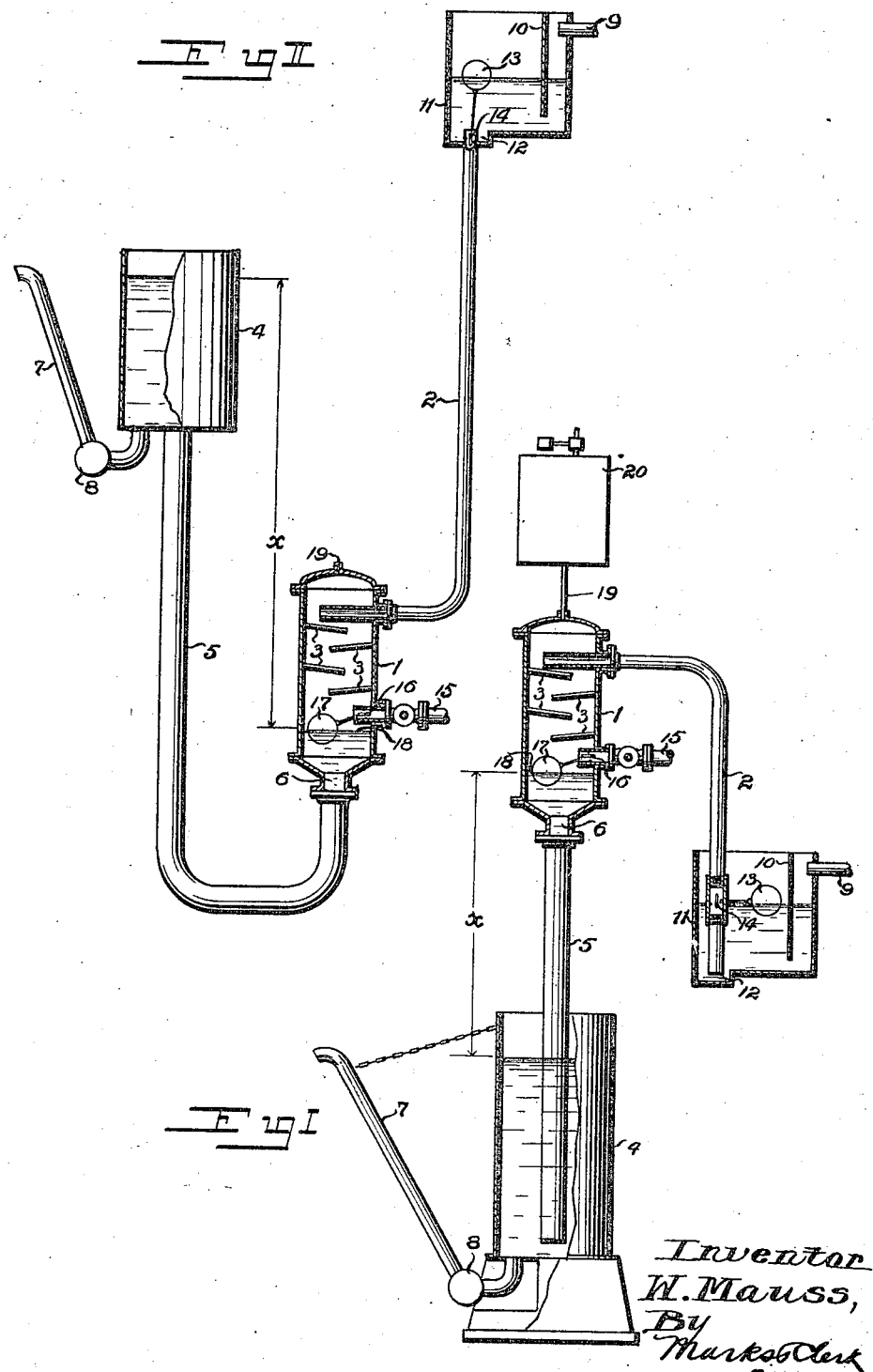

1,454,553

UNITED STATES PATENT OFFICE.

WILHELM MAUSS, OF JOHANNESBURG, TRANSVAAL, SOUTH AFRICA, ASSIGNOR TO CONTINUOUS CENTRIFUGALS LIMITED, OF JOHANNESBURG, TRANSVAAL PROVINCE, UNION OF SOUTH AFRICA.

HEAT TREATMENT OF LIQUID.

Application filed March 23, 1921. Serial No. 454,956.

*To all whom it may concern:*

Be it known that WILHELM MAUSS, a British subject, residing at 72 Cullinan Building, Simmonds Street, Johannesburg, Transvaal Province of the Union of South Africa, has invented certain new and useful Improvements in the Heat Treatment of Liquid, of which the following is a specification.

The present invention has reference to the heat treatment of liquids. The object is the direct treatment of liquid by steam with automatic regulation of the treatment temperature and the quantity of steam consumed. In the treatment, for example, of sugar juice for the purpose of coagulating its albuminous contents, it is usual to heat the juice by means of a steam coil. In order to effect rapid transfer of heat, high temperature steam is passed through the coil, with the result that the juice immediately in contact with the coil is liable to be overheated and to discolour the juice as a whole. The present invention provides a process and apparatus which enable sugar juice or other liquid to be treated rapidly and continuously and which automatically maintains the temperature of the liquid under treatment at the desired point and permits considerable variation of the quantity of liquid treated. The quantity of steam consumed is exactly regulated to the requirements at any moment, so that economy of steam is assured without the possibility of the liquid being insufficiently heated.

In the accompanying drawings Fig. I is a sectional elevation of a heater working at less than normal boiling temperature, and Fig. II is a similar view of a modification for superheating the liquid.

1 is a closed vessel in which the heat treatment is carried out. The liquid enters by a pipe 2 and is broken up as by flowing over baffles 3. The treated liquid falls to the bottom of the vessel 1 and passes away to a receiver 4 through a barometric pipe 5. The latter is arranged to contain a column 6 of the liquid, which causes a predetermined pressure within the vessel 1 and is balanced by said pressure. The predetermined pressure is that under which the liquid will boil at the temperature which it is required to be heated to. Thus if such temperature is less than that at which the liquid boils under normal atmospheric pressure, the barometric pipe 5 is extended downwardly as indicated in Fig. I to make the head $x$ negative and reduce the pressure within the vessel to the necessary extent. Similarly according to the required temperature, the heat can be varied to any necessary degree through zero to the positive value to increase the pressure in the vessel 1 above normal when the liquid is to be superheated; the barometric pipe 5 being then carried upwards, as shown in Fig. II. A raised overflow pipe 7 hinged at 8 enables the level of the liquid in the receiver 4 to be adjusted as required.

The liquid to be treated is fed from a pipe 9 past a baffle 10 to a feed tank 11 having a sump 12 into which the feed pipe 2 dips, and is conveyed through said feed pipe by any suitable means. As shown in Fig. I liquid is passed up the pipe 2 by the atmospheric pressure acting on it in the tank 11, which is greater than the pressure within the vessel 1; whilst in the Fig. II arrangement the feed tank 11 is raised above the vessel 1 to cause the liquid to flow by gravity against the pressure in vessel 1. The rate of flow through the pipe 2 is automatically adjusted to the rate of supply from the pipe 9 by a float 13 actuating a butterfly valve 14. Steam is supplied by a pipe 15 and its volume is controlled by a valve 16. The latter is actuated by a float 17 supported on the surface 18 of the barometric column of liquid 6 so that rising of said column in the vessel 1 closes the valve 16. The range of movement of the float 17 completely to open or close the valve is small. 19 is an outlet for air and uncondensed steam, which is of such small area as not materially to affect the pressure conditions within the vessel 1. In the Fig. I construction the air and surplus steam is evacuated by connecting the outlet 19 to an exhausted chamber 20. Fig. II shows the outlet 19 simply opening to the atmosphere.

The operation is a follows. Assuming the apparatus is charged with liquid as shown, the barometric column 6 maintains the pressure within the vessel 1 corresponding to the temperature desired. Liquid syphons through the system from the feed tank 11 to the receiver 4 without affecting the pressure conditions in vessel 1, except by giving off air and some vapour which is passed away by the outlet 19.

Steam is supplied from the pipe 15 at a pressure somewhat higher than that prevailing in the vessel 1; but whatever its original pressure, its temperature, immediately it enters the vessel 1, becomes that corresponding to the pressure in said vessel. Said steam comes into direct contact with the comminuted liquid falling over the baffles 3. Latent heat is given up by the steam to the liquid, thereby raising the temperature of the liquid to that of the steam (more of which enters the vessel) whilst the steam is condensed without change of temperature. If the inflow of liquid increases, it tends to condense the steam more rapidly than the latter is supplied and consequently to decrease the pressure within the vessel 1. The barometric column 6 rises, lifts the float 17 and admits a compensating greater volume of steam; an excess of steam being always available. On the other hand should the steam be in excess at any moment, it increases the pressure in vessel 1. causing the surface 18 of the barometric column 6 to fall and with it the float 17, so shutting off steam to establish equilibrium. Thus in the state of substantial equilibrium to which the apparatus always tends, just the requisite amount of steam is admitted to heat the liquid exactly to its boiling point under the particular pressure which is maintained. The latter can vary only within the small limits of the barometric column corresponding to full opening and full closing of the steam valve 16 so that the heating of the liquid is uniform between corresponding limits.

Variation of the treatment temperature can be made, within certain limits, by simply raising or lowering the overflow pipe 7 and so altering the effective height of the barometric column.

I claim—

1. The process of heat treating liquid which consists in passing steam and the liquid into a closed vessel and causing them to come into physical contact within said vessel, passing the treated liquid from the vessel through a barometric pipe, and controlling the admission of steam to the vessel according to the height of the liquid column in said pipe.

2. Apparatus for heat treating liquid, consisting of a closed vessel adapted to exhaust surplus gas, means to feed the liquid into the vessel, an outlet for liquid from the vessel consisting of a barometric pipe adapted to retain a column of liquid balancing the pressure within the vessel, an inlet admitting steam to mingle directly with the liquid in the vessel, and means controlled by the height of the liquid column in the barometric pipe and controlling the inflow of steam.

In testimony whereof I affix my signature.

WILHELM MAUSS.